United States Patent [19]

Meunier

[11] Patent Number: 4,567,234
[45] Date of Patent: Jan. 28, 1986

[54] GRAFT COPOLYMERS OF ALKYL METHACRYLATES ONTO CROSS-LINKED BUTADIENE - ALKYL ACRYLATE COPOLYMERS AND THEIR USE AS IMPACT MODIFIERS

[75] Inventor: Gilles Meunier, Lescar, France

[73] Assignee: M&T Chemicals Inc., Woodbridge, N.J.

[21] Appl. No.: 623,645

[22] Filed: Jun. 22, 1984

[30] Foreign Application Priority Data

Aug. 31, 1983 [FR] France ................... 83 13998

[51] Int. Cl.$^4$ ................. C08L 39/04; C08L 51/00
[52] U.S. Cl. ........................................ 525/73; 525/63; 525/66; 525/67; 525/80; 525/81; 525/82; 525/83; 525/85; 525/293; 525/296; 525/302; 525/305; 525/309; 525/310
[58] Field of Search ............... 525/73, 260, 263, 313, 525/80, 81, 82, 83, 85, 63, 66, 67, 293, 296, 302, 305, 309, 310

[56] References Cited

U.S. PATENT DOCUMENTS

| | | | |
|---|---|---|---|
| 3,041,309 | 6/1962 | Baer | 260/45.5 |
| 3,264,373 | 8/1966 | Whitworth et al. | 260/876 |
| 3,655,825 | 4/1972 | Souder et al. | 260/876 R |
| 3,678,133 | 7/1972 | Ryan | 260/876 R |
| 3,749,755 | 7/1973 | Bronstert et al. | 260/876 R |
| 3,787,522 | 1/1974 | Dickie et al. | 260/836 |
| 3,842,144 | 11/1974 | Tanaka et al. | 260/876 R |
| 3,886,235 | 5/1975 | Tanaka et al. | 260/880 R |
| 3,922,321 | 11/1975 | Yusa et al. | 260/876 |
| 3,959,408 | 5/1976 | Yusa et al. | 260/876 R |
| 3,985,703 | 10/1976 | Ferry et al. | 260/42.29 |
| 4,014,842 | 3/1977 | Kosugi et al. | 260/29.6 RB |
| 4,078,018 | 3/1978 | Chavel et al. | 260/880 R |
| 4,173,596 | 11/1979 | DeWitt et al. | 428/402 |
| 4,229,549 | 10/1980 | Usami et al. | 525/76 |
| 4,376,843 | 3/1983 | Linder et al. | 525/83 |

OTHER PUBLICATIONS

6001 Chemical Abstracts, vol. 94, Jun. 1981, No. 11, Columbus, Ohio, U.S.A., 94:176054a.

*Primary Examiner*—Jacob Ziegler
*Attorney, Agent, or Firm*—S. H. Parker; J. Matalon; R. E. Bright

[57] ABSTRACT

The impact resistance of resin compositions consisting of a thermoplastic polymer, particularly a homopolymer or copolymer of vinyl chloride, can be improved by an impact additive of the graft copolymer type. The graft copolymer impact additive consists of a backbone composed of a statistical copolymer of butadiene or isoprene, an alkyl acrylate of a $C_2$ to $C_{12}$ alkyl, and a polyfunctional cross-linking agent, onto which are grafted the chains of a polymer of an alkyl methacrylate of a $C_1$ to $C_4$ alkyl, particularly methyl methacrylate. The backbone of the graft copolymer impact additive comprises 0.5-35% by weight butadiene or isoprene, and up to 10 mole % of the cross-linking agent, while the weight ratio of grafted chains to the backbone can range from 10 to 200%.

The resin compositions are particularly useful to improve impact strength at low temperatures.

30 Claims, No Drawings

GRAFT COPOLYMERS OF ALKYL METHACRYLATES ONTO CROSS-LINKED BUTADIENE - ALKYL ACRYLATE COPOLYMERS AND THEIR USE AS IMPACT MODIFIERS

This invention concerns resin compositions with an improved impact strength, said compositions comprising a thermoplastic polymer, particularly homopolymers or copolymers of vinyl chloride, an impact additive of the graft copolymer type, and possibly other additives.

BACKGROUND OF THE INVENTION

Certain synthetic resins, particularly homopolymers and copolymers of vinyl chloride, which are very widely used because of their low cost and good physical and chemical properties, have a low impact strength at ambient temperatures, at low temperatures, or after aging. The proposal has been made to remedy these faults by incorporating into these resins products, called impact additives, which are polymers with a certain elastomeric character. Of particular interest among these additives are polyacrylates, modified or unmodified, and also statistical or graft copolymers based on butadiene. In particular, U.S. Pat. No. 3,264,373 describes an impact additive for polymer-based resins containing a least 80% by weight of polymerized vinyl chloride: it consists of a copolymer of methyl methacrylate grafted onto a backbone formed of a polymer consisting, by weight, of 1 to 20% butadiene and 99 to 80% of an alkyl acrylate of $C_2$ to $C_{12}$ alkyl, said graft copolymer having a grafted methyl methacrylate content of between 10 and 185% preferably 20-50% by weight of the backbone copolymer. Incorporated in the vinyl chloride polymer resin, in a proportion of 0.5-50 parts by weight for each hundred parts of resin, such an additive produces a substantial increase in the impact strength of the resin, with practically no reduction in its heat distortion temperature.

It has now been found that if, in such an additive, the backbone copolymer is replaced with a similar copolymer that has been cross-linked by means of a small quantity of polyfunctional cross-linking agent, one obtains an impact additive with improved effectiveness.

The impact additive used as described in this invention thus produces synthetic resin compositions which have improved impact strength properties at ambient temperature, at low temperatures, or after aging, as compared to those of comparable synthetic resin compositions incorporating the impact additive described in the above-mentioned U.S. patent.

DESCRIPTION OF THE INVENTION

The subject of this invention is therefore synthetic resin compositions with improved impact strength, which comprise: a thermoplastic polymer: an impact additive of the graft copolymer type used in quantities varying between 0.5 and 50 parts by weight for each 100 parts of the thermoplastic polymer, and comprising a cross-linked backbone composed of a statistical copolymer of a conjugated diene selected from butadiene and isoprene and an alkyl acrylate of a $C_2$ to $C_{12}$ alkyl having a polymerized conjugated diene content ranging between 0.5 and 35% by weight, onto which are grafted, in quantities varying between 10 and 200% by weight of the backbone, chains of a polymer comprising a polymerized alkyl methacrylate; and possibly other additives.

In one aspect the invention relates to a synthetic resin composition having improved impact strength; in an embodiment of this aspect, the invention relates to a thermoplastic resin composition having improved low temperature impact strength which comprises a homopolymer or copolymer of vinyl chloride and an impact additive. In another aspect the invention relates to a method for improving the impact resistance of a thermoplastic resin which comprises incorporating therein a graft copolymer impact additive. In yet another aspect, the invention relates to a graft copolymer, as described.

According to one preferred means of practicing the invention, the backbone of the graft copolymer impact additive comprises a copolymer of the conjugated diene, the $C_2$-$C_{12}$ alkyl acrylate, and a polyfunctional cross-linking agent copolymerizable with said diene and alkyl acrylate, which cross-linking agent has in its molecule at least two unsaturated $CH_2$=C< groups, said copolymer comprising 0.5-35% by weight of the polymerized diene and having a molar concentration of the polymerized cross-linking agent ranging from 0.02 to 10%, preferably 0.05 to 7%.

Said polyfunctional cross-linking agent can, in particular, be selected from derivatives with two or more vinyl or allyl double bonds, such as divinylbenzenes, triallyl cyanurate, diallyl phthalate, diallyl itaconate, triallyl isocyanurate, trimethylolpropane triacrylate or trimethacrylate, allyl acrylate or methacrylate, alkylene glycol diacrylate or dimethacrylate with 2–10 carbon atoms in the alkylene chain, and particularly ethylene glycol diacrylate or dimethacrylate, 1,4-butanediol diacrylate or dimethacrylate, 1,6-hexanediol diacrylate or dimethacrylate, or polyoxalkylene glycol diacrylate or dimethacrylate with the formula

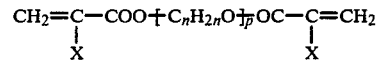

in which X is hydrogen or methyl, n is a whole number ranging from 2 to 4, and p is a whole number ranging between 2 and 20, and particularly polyoxyethylene glycol diacrylate or dimethacrylate, in which the polyoxyethylene radical has a molecular weight of about 400 (i.e., the case in the above-mentioned formula where n=2 and p=9).

As indicated above, the alkyl acrylate, which is polymerized with butadiene or isoprene and with the polyfunctional cross-linking agent to make up the backbone of the graft polymer impact additive, is an alkyl acrylate of a $C_2$ to $C_{12}$ alkyl, said alkyl radical being preferably free of branching on the carbon bonded to the acryloxy group. Examples of acrylates that are appropriate for the formation of the backbone copolymer include ethyl acrylate, n-propyl acrylate, n-butyl acrylate, amyl acrylate, 2-methylbutyl acrylate, 3-methylbutyl acrylate, n-hexyl acrylate, n-octyl acrylate, n-decyl acrylate, or 2-ethylhexyl acrylate.

The preferred concentration of polymerized butadiene or isoprene in the copolymer which, cross-linked or not, forms the backbone of the graft copolymer impact additive, is 1–25% by weight of the backbone copolymer.

In the impact additive according to the invention, the chains grafted onto the backbone comprise a polymer of an alkyl methacrylate of a $C_1$ to $C_4$ alkyl. Alkyl methacrylates that can be used include ethyl methacrylate, n-propyl methacrylate, isopropyl methacrylate, n-butyl methacrylate, isobutyl methacrylate, and especially methyl methacrylate.

It is advantageous if the grafted chains represent from 10% to 60% by weight of the backbone of the graft copolymer.

In order to estimate the molecular weight of the impact additive, a viscosity in the molten state can be defined, which varies with the molecular weight. This viscosity in the molten state can have a fairly large range of values, provided that its value is sufficient to prevent migration of the impact additive during the processing of the resin composition incorporating said additive. As a representative value for this viscosity in the molten state, it is convenient to take the value of the resisting torque of a Brabender rheometer containing 50 g of the impact additive and operating at temperature of 200° C. with a rotor rotation rate of 40 rpm; measurement of the torque is done after 20 minutes at 200° C. Appropriate values for the viscosity in the molten state of the impact additive correspond to values for the above-mentioned torque which are between 6 and 40 Nm. In the case of resin compositions in which the thermoplastic polymer is a polymer comprising at least 80% by weight of polymerized vinyl chloride, the preferred values for viscosity in the molten state of the impact additive correspond to values for the above-mentioned torque ranging between 8 and 30 Nm, especially between 10 and 25 Nm.

The impact additive can be prepared by any method which allows the production of a graft copolymer with a backbone and grafted chains as defined above. However, it is preferable to prepare the backbone of the graft copolymer, and also to perform the grafting process, using techniques of emulsion polymerization.

The following polymerization procedure can be used. In the first stage, an emulsion is formed comprising, for each part by weight of the monomer to be polymerized, 1 to 10 parts of water, 0.001 to 0.03 part of an emulsifying agent, and the monomers to be polymerized to make up the backbone of the graft polymer impact additive, namely butadiene or isoprene, the alkyl acrylate of a $C_2$ to $C_{12}$ alkyl, and a polyfunctional cross-linking agent, in proportions corresponding to those desired in the backbone copolymer. One then adds 0.001 to 0.05 part of a free radical-generating catalyst, and keeps the reaction medium thus formed at a temperature between, for example, room temperature and 90° C., with stirring, for a long enough period to obtain practically complete conversion of the monomers. In the second state, an alkyl methacrylate of a $C_1$ to $C_4$ alkyl is grafted onto the backbone copolymer obtained during the first stage. This is done by adding an appropriate quantity of the alkyl methacrylate to the reaction medium which resulted from the first stage, to obtain a graft copolymer which has the desired proportion of graft chains as well as, if desired, the additional quantities of emulsifying agent and a radical-type catalyst, also within the limits defined above. The mixture thus formed is maintained at a temperature in the above-mentioned range, with stirring, until one obtains practically complete conversion of the grafting monomers.

As the emulsifying agent, any one of the known surfactants may be used, whether anionic, nonionic, or cationic. In particular, the emulsifying agent may be chosen from among the anionic surfactants such as the sodium or potassium salts of fatty acids, particularly sodium laurate, sodium stearate, sodium palmitate, sodium oleate, mixed sulfates of sodium or potassium and fatty alcohols, particularly sodium lauryl sulfate, sodium or potassium salts of sulfosuccinic esters, sodium or potassium salts of the alkyl aryl sulfonic acids, particularly sodium dodecylbenzene sulfonate, sodium didodecylnaphthalene sulfonate, and sodium or potassium salts of fatty monoglyceride monosulfonates, or also from among the nonionic surfactants such as the reaction products of ethylene oxide and an alkyl phenol or aliphatic alcohols, alkyl phenols, or aliphatic alcohols. Mixtures of these surfactants can also be used if necessary.

Catalysts that might be used in both the first and the second stage of emulsion polyermization as mentioned above are compounds which produce free radicals under the temperature conditions chosen for polymerization. These compounds may be, in particular, peroxide compounds such as hydrogen peroxide, persulfates of the alkali metals, particularly sodium or potassium persulfate, ammonium persulfate, percarbonates, peracetates, perborates, peroxides such as benzoyl peroxide or lauroyl peroxide, and hydroperoxides such as cumene hydroperoxide, paramenthane hydroperoxide or tert-butyl hydroperoxide. However, it is preferable to use catalytic systems of the redox type, formed by the combination of a peroxide compound, for example one of those mentioned above, or a persulfate with a reducing agent, particularly a sulfite of an alkali metal, a bisulfite of an alkali metal, a sulfoxylate of an alkali metal, ascorbic acid, or glucose, and in particular those of the above-mentioned catalytic systems which are water-soluble, for example potassium persulfate/sodium metabisulfite or also tert-butyl hydroperoxide/sodium metabisulfite.

One can also add to the polymerization mixture of either or both of the stages, chain-limiting compounds, particularly mercaptans such as tert-dodecyl mercaptan, isobutyl mercaptan and n-dodecyl mercaptan, with the aim of regulating the molecular weight of the backbone and/or of the grafted chains of the graft copolymer; one can also add compounds such as phosphates in order to control the ionic strength of the polymerization medium.

The reaction medium obtained at the end of the second stage of emulsion polymerization, which consists of an aqueous emulsion of the graft copolymer produced, is then treated in order to separate the graft copolymer from it. This can be done by, for example, subjecting the emulsion to a coagulation treatment by contact with a salt solution that has been acidified with concentrated sulfuric acid, then separating by filtration the solid product resulting from coagulation; said solid product is then washed and dried to yield a powder of the graft copolymer. The graft copolymer contained in the emulsion can also be recovered by means of a spray-drying technique.

The resulting graft copolymer is a powder whose grain size can range between a few microns (for example 1-5 microns) and 200-300 microns; said grain size depends on the technique used to separate the graft copolymer from the emulsion polymerization medium.

Resin compositions according to the invention can be prepared by any method allowing the production of a homogeneous mixture comprising a thermoplastic polymer, the impact additive, and possibly other additives. For example, the ingredients composing the resin composition can be mixed together in the dry state, and the resulting mixture can then be extruded. When the thermoplastic polymer is produced by emulsion polymerization, it may be convenient to mix the emulsion of the graft copolymer with the emulsion of the thermoplastic polymer, and to process the resulting emulsion to separate out from it the solid product it contains; the techniques can be described above with reference to separation of the graft copolymer.

The thermoplastic copolymer, which forms one of the constituent elements of the resin compositions according to this invention, may consist of one or more polymers of the polycondensate type, particularly polyesters such as polybutylene terephthalate, polycarbonates or polyamides, or also of the addition polymer type, such as, for example, polymethacrylate and particularly polymethyl methacrylate. Preferably, the thermoplastic polymer consists of one or more addition polymers chosen from the group formed by the homopolymers of vinyl chloride which may possibly be perchlorinated, and the copolymers which result from the copolymerization of vinyl chloride with one or more ethylene-unsaturated comonomers and which contain at least 80% by weight of polymerized vinyl chloride. Examples of comonomers for the preparation of such copolymers are particularly the vinylidene halides such as vinylidene chloride or fluoride, the vinyl carboxylates such as vinyl acetate, vinyl propionate and vinyl butyrate, acrylic and methacrylic acids as well as the nitriles, amides and alkyl esters which are derived from them, particularly acrylonitrile, acrylamide, methacrylamide, methyl methacrylate, methyl acrylate, butyl acrylate, ethyl acrylate, and 2-ethylhexyl acrylate, the vinyl aromatic derivatives such as styrene or vinylnaphthalene, and the olefins such as bicyclo[2.2.1]hept-2-ene, bicyclo[2.2.1]-hepta-2,5-diene, ethylene, propene and 1-butene.

Additives in addition to the impact additive which can be present in the resin compositions according to the invention include those such as pigments, coloring agents, plasticizers, antioxidants, heat stabilizers, additives facilitating processing, and lubricants.

The preferred concentration of impact additive in the resin compositions described above represents 1-30% by weight of the thermoplastic polymer. Concentrations of impact additive between 2 and 10% by weight of the thermoplastic polymer are especially appropriate when said polymer is selected from the group formed by the polymers of vinyl chloride and the copolymers of vinyl chloride with a comonomer such as those defined above. The resin compositions obtained in this latter case are appropriate for the manufacture of exterior facing products, such as vinyl siding.

The invention is illustrated by the following examples, which are not limiting.

EXAMPLE 1

(a) Synthesis of a Graft Copolymer Impact Additive According to the Invention

This process was carried out in a reactor equipped with a stirring device and provided with a double jacket containing a heating fluid to maintain the temperature of the reactor.

(1) Preparation of the Backbone Copolymer

After nitrogen degassing, 1,180 g of demineralized water and 3.43 g of disodium phosphate were placed in the reactor, which was kept at ambient temperature with stirring; in this medium was dissolved 28.7 g of sodium lauryl sulfate as emulsifying agent. The temperature of the reactor contents was then brought to 57° C. and, while this temperature was maintained, 628 g of butyl acrylate, 64.8 g of butadiene and 7.7 g of allyl methacrylate were added simultaneously to the contents. While the temperature of the reactor was kept at 57° C., 1.7 g of tert-dodecyl mercaptan diluted in 8 ml of water was then added to the sodium metabisulfite in 19 ml of water and 0.91 g of potassium persulfate in 32 ml of water as the catalytic system. The contents of the reactor were then maintained at 57° C. for 3 hours, and then at 80° C. for one hour, after which the reactor was cooled to 57° C. The yield, with 99% conversion, was a cross-linked butadiene/butyl acrylate/allyl methacrylate copolymer in the form of a latex and containing, by weight, 9.2% of polymerized butadiene. The molar proportion of allyl methacrylate in this copolymer was 1%.

(2) Grafting of the Methacrylate onto the Backbone Copolymer 291 g of methyl methacrylate was added, with stirring, to the contents of the reactor, cooled to 57° C. at the conclusion of the preparation of the backbone copolymer, followed by 0.325 g of tert-dodecyl mercaptan.

In the reaction medium thus formed were then dissolved 0.13 g of sodium metabisulfite in 13 ml of water and 0.32 g of potassium persulfate in 13 g of water. The contents of the reactor were maintained at 57° C. for 1.4 hours, and its temperature was then raised to 80° C. and 0.52 g of tert-butyl hydroperoxide and 0.13 g of sodium metabisulfite in 13 ml of water were then added to the contents. The reaction mixture was then kept at 80° C. for one hour. At the end of this period, the contents of the reactor were cooled to room temperature and the latex of the graft copolymer produced, whose average particle diameter was 0.15 um, was coagulated in a salt solution acidified with concentrated sulfuric acid. The coagulated product was then filtered, washed and dried to yield a powder constituting the graft copolymer impact additive.

Conversion of the methyl methacrylate during grafting was about 99%. The graft copolymer contained a proportion of grafted chains of polymethyl methacrylate representing 41.6% of the weight of the backbone copolymer, and had a viscosity in the molten state corresponding to a value equal to 15.8 Nm of torque on the Brabender rheometer operating under the conditions set out in the description above.

(b) Synthesis of a Graft Copolymer Impact Additive as Control

Under conditions similar to those described in section (a) of this example, a control graft copolymer was synthesized, composed of chains of polymethyl methacrylate grafted onto a backbone copolymer of butadiene and butyl acrylate.

This was done by using, in the backbone copolymer phase 628 g of butyl acrylate but no allyl methacrylate crosslinking agent, while the other operating conditions remained the same.

With a methyl methacrylate conversion of 99%, this yielded a graft copolymer containing a proportion of grafted polymethyl methacrylate representing 42% of the backbone copolymer, said backbone copolymer incorporating 9.3% by weight of polymerized butadiene. Said graft copolymer possessed a viscosity in the molten state corresponding to a value of 15.6 Nm of torque on the Brabender rheometer.

(c) Preparation and Characteristics of the Resin Compositions

The following describes the preparation of a PVC-based resin composition suitable for the production of exterior siding products, and gives the impact strength characteristics of test pieces made from this resin composition.

Into a Papenmeir-type mixer were placed 5 parts by weight of the impact additive prepared as described in section (a) (additive 1.a) or in section (b) (control additive 1.b) of this Example, 100 parts by weight of PVC with a K value of 67, 0.3 parts by weight of a processing aid consisting of an acrylic polymer (Paraloid K 175, marketed by Rohm & Haas), 2 parts of calcium stearate, 1 part of a polyethylene wax with a melting point of 74° C., 1.5 parts of a heat stabilizer based on tin thioglycolate, and 12 parts of TiO$_2$.

Using the composition in this fashion, test pieces were prepared for the following tests to determine the impact strength characteristics.

Impact tensile test (ASTM standard D 1822-68):

A measurement is taken of the energy required to break a standard test piece by means of an impact producing tensile stress in the test piece.

Izod impact bending test (ASTM standard D 256-73):

A measurement is taken on the energy absorbed by the breakage of a notched test piece, clamped at one end, and subjected to an impact producing bending of the test piece.

Low temperature impact strength test:

In this test, a method is used which is derived from that defined in ASTM Standard D 3029-72; a measurement is taken of the energy absorbed in breaking a plate-shaped test piece, placed horizontally and kept at low temperature, and subjected to an impact applied by a 5.1 kg weight ending in a cylinder with a diameter of 12.7 mm and with one rounded end, said weight falling freely from a height of 70 centimeters.

In order to prepare the test pieces for the impact-tensile and the Izod impact tests, the resin composition derived from the mixture of the above-mentioned ingredients was calendered at 165° C. for 7 minutes on a Schwabenthan-type caldendering machine, then molded at 190° C. on a Derragon press for 5 minutes under a pressure of 200 bars, into the form of plates; said plates were cooled while under pressure. The test pieces were prepared with a punch in the case of the impact-tensile tests, and with a circular saw and a notcher for the Izod impact tests. The thickness of the test pieces, whose shape was that prescribed by the above-mentioned standards, was 1 mm for the impact-tensile test, and 3 mm for the Izod impact test.

To prepare the test pieces for the low-temperature impact strength test, the resin composition defined above was kneaded in a double-screw extruder of the Krauss-Maffei KMD 25 type, then molded in a press operating at 190° C. under 200 bars, into the form of plates with a length and width of 60 mm and a thickness of about 1 mm.

One batch of the test pieces used for the impact-tensile test had previously been subjected to 1000 hours of aging under the radiation emitted by a xenon lamp in an accelerated-aging system of the Climatron type. In order to take into account the influence of aging, the term "percentage of loss" was used to define a magnitude corresponding to the relative change in energy at breakage, with the form $(E-E_v)/(E) \times 100$, where E and $E_v$ represent, respectively, the energies at breakage before and after aging for 1000 hours in the Climatron.

A comparison of the results shown in Table 1 indicates that replacement of the butadiene/butyl acrylate copolymer backbone in the graft copolymer impact additive with a corresponding copolymer cross-linked by allyl methacrylate leads, under otherwise identical condition, to an improvement in the impact strength characteristics of the resin composition incorporating the impact additive, and that this improvement is noticeable after aging and particularly marked at low temperature.

TABLE I

| Impact Additive | Impact-Tensile Test at 21° C. | | | Notched Izod Impact at 21° C. | Low Temperature Impact Test | | |
|---|---|---|---|---|---|---|---|
| | E (α) (kJ/m$^2$) | Ev (α) (kJ/m$^2$) | % of Loss | Energy at breakage (J/cm of notch) | Test Temperature | Energy at Break (J/mm) (β) | Force at Break (daN/mm) (γ) |
| 1. a (Invention) | 747 | 509 | 32 | 14 | −10° C. | 16.3 | 209 |
| | | | | | −20° C. | 13.6 | 210 |
| 1. b (Control) | 710 | 381 | 46 | 13 | −10° C. | 10 | 189 |
| | | | | | −20° C. | 7 | 178 |

(α) — kJ/m$^2$ = kilojoules per m$^2$ of test piece
(β) — J/mm = joules per mm of thickness of the test piece plate
(γ) — da N/mm = daN per mm of thickness of the test piece plate

EXAMPLES 2-5

(a) Synthesis of the Cross-linked Graft Copolymer Impact Additives According to the Invention Using a reactor equipped with a stirrer and provided with a double jacket containing a heating fluid to maintain the reactor temperature, four synthesis tests were done with cross-linked graft copolymers according to the invention, in which the cross-linking agent was, respectively, allyl methacrylate (Examples 2 and 3), ethylene glycol dimethacrylate (Example 4) and polyethylene glycol dimethacrylate with a polyoxyethylene chain with a molecular weight of about 400 (Example 5).

(1) Preparation of the Cross-linked Copolymer Backbone 1,180 g of demineralized water and 3.43 g of disodium phosphate, after nitrogen degassing, were introduced into the reactor at room temperature while stirring; in this mixture was dissolved 28.7 g of sodium lauryl sulfate as emulsifying agent. The temperature of the reactor contents was then raised to 57° C., and while this temperature was being maintained, the monomers forming the cross-linked backbone copolymer butyl acrylate, diene, and cross-linking agent were then added simultaneously in the amounts indicated in Table 2. While the temperature of the reactor was still kept at 57° C., 0.85 g of tert-dodecyl mercaptan in 8 ml of water was added as a chain limiter, together with 0.58 g of sodium metabisulfite in 13.5 ml of water and 0.91 g of potassium persulfate in 13.5 ml of water as a catalytic system. The contents of the reactor were then kept at 57° C. for 3 hours and then at 80° C. for one hour, after which the reactor was cooled to 55° C.

The yield, with 98.5% conversion of the monomers, was a butadiene/butyl acrylate/cross-linking agent terpolymer. Table 2 gives the nature and amount of monomers used, as well as the contents of polymerized diene and polymerized cross-linking agent in the backbone copolymer produced in each of Examples 2–5.

(2) Grafting of the Methacrylate onto the Backbone Copolymer 290 g of methyl methacrylate were used for the grafting; the operating conditions for the grafting process were the same as those described in part (a.2) of Example 1.

Conversion of the methyl methacrylate was about 99% in each of the tests.

The graft copolymers obtained incorporated a proportion of grafted chains of polymethyl methacrylate representing 40.6% for Example 2, 39.3% for Example 3, 41.4% for Example 4, and 40.1% for Example 5, relative to the weight of the backbone copolymer, and had a viscosity in the molten state corresponding to a Brabender rheometer torque reading, obtained as defined above, of 10.3 Nm for Example 2, 14.5 Nm for Example 3, 18.3 Nm for Example 4, and 14.5 Nm for Example 5.

trol graft polymer synthesized as described in part (b) of Example 1.

Test pieces were formed from these compositions, and the impact strength characteristics of the test pieces were determined as indicated in Example 1.

The results obtained are summarized in Table 3.

These results show that replacing the butadiene/butyl acrylate copolymer backbone of the graft copolymer impact additive with a cross-linked butadiene or isoprene/butyl acrylate/cross-linking agent copolymer backbone improves the impact strength of the resin composition containing the impact additive, and more particularly its impact strength at low temperature and after aging.

TABLE III

| Impact Additive | Impact-Tensile Test at 21° C. | | | Notched Izod Impact at 21° C. | Low Temperature Impact Test | | |
|---|---|---|---|---|---|---|---|
| | E (kJ/m²) | Ev (kJ/m²) | % of Loss | Energy at breakage (J/cm of notch) | Test Temperature | Energy at Break (J/mm) | Force at Break (daN/mm) |
| Ex. 2 | 740 | 502 | 32 | 13.9 | −10° C. | 15.2 | 204 |
| | | | | | −20° C. | 12 | 198 |
| Ex. 3 | 806 | 580 | 28 | 15 | −10° C. | 13.8 | 197 |
| | | | | | −20° C. | 9 | 183 |
| Ex. 4 | 718 | 498 | 30 | 13.4 | −10° C. | 15.4 | 206 |
| | | | | | −20° C. | 12 | 197 |
| Ex. 5 | 791 | 538 | 32 | 14.5 | −10° C. | 13.5 | 198 |
| | | | | | −20° C. | 10 | 185 |
| Ex. 1. b Control | 710 | 381 | 46 | 13 | −10° C. | 10 | 189 |
| | | | | | −20° C. | 7 | 178 |

EXAMPLES 6–8

(a) Synthesis of Cross-Linked Graft Copolymer Impact Additives According to the Invention Using a reactor equipped with a stirrer and a double jacket containing a heating fluid to maintain the reactor temperature, a series of cross-linked graft copolymers according to the invention was prepared, by grafting methyl methacrylate onto a backbone copolymer consisting of a copolymer of butadiene/butyl acrylate/cross-linking agent; said cross-linking agent was polyoxyethylene glycol dimethacrylate, with a polyoxyethylene chain having a molecular weight of about 400 (formula defined previously, with $X=CH_3$, $n=2$ and $p=9$) used in the synthesis of Example 5.

The preparation of the backbone copolymer and the implementation of grafting were carried out under the operating conditions defined in Example 5, but variable quantities of the cross-linking agent were used.

Conversion of the monomers curing each of the

TABLE II

| Example | Conjugated Diene | | Butyl Acrylate gms | Cross-linking Agent | | Backbone Copolymer | |
|---|---|---|---|---|---|---|---|
| | Type | Amount gms | | Type | Amount gms | Content of Polymerized Diene (% by weight) | Content of Polymerized Cross-linking (mole %) |
| 2 | Isoprene | 81 | 628 | MA | 7.7 | 11.3 | 1 |
| 3 | Butadiene | 64.8 | 628 | MA | 38.5 | 8.9 | 4.8 |
| 4 | Butadiene | 64.8 | 628 | DMEG | 12.1 | 9.2 | 1 |
| 5 | Butadiene | 64.8 | 628 | DMPEG | 32.7 | 8.9 | 0.97 |

MA = allyl methacrylate
DMEG = ethylene glycol dimethacrylate
DMPEG = polyethylene glycol dimethacrylate in which the polyoxethylene chain has a molecular weight of about 400 (see formula above, with $X = CH_3$, $n = 2$ and $p = 9$)

(b) Preparation and Characteristics of the Resin Compositions

Five PVC-based resin compositions were prepared as described in section (c) of Example 1, using as impact additive a graft copolymer chosen from among the graft copolymers synthesized in Examples 2–5, and the constages of preparation of the graft copolymers was about 98%.

(b) Preparation and Characteristics of the Resin Compositions

PVC-based resin compositions were prepared as described in section (c) of Example 1, using as the impact additive a copolymer selected from among the graft copolymers synthesized as described in part (a) of the Examples 6–8 and the control graft copolymer synthesized as indicated in part (b) of Example 1.

These compositions were used to form test pieces for the impact-tensile test, and a measurement was taken of the breakage energy E under impact-tensile stress, as indicated in Example 1.

The quantities of cross-linking agent used, the compositions of the graft copolymers produced, and the results of the impact-tensile tests are given in Table 4.

As the results of the impact-tensile test show, the PVC resin compositions incorporating the impact additive according to the invention have improved impact strength as compared to corresponding resin composition incorporating the same concentration of control impact additive.

TABLE IV

| | | Graft Polymer | | | | |
| | | Backbone | Grafts | | | |
| Example | Quantity of Cross-Linking Agent (g) | Polymerized Butadiene Weight % | Polymerized Cross-Linking Agent Mole % | Weight Ratio Between Grafts and BackBone | Torque On Brabender Rheometer (Nm) | Impact-Tensile at 21° C. E(kJ/m$^2$) |
|---|---|---|---|---|---|---|
| 6 | 4.9 | 9.28 | 0.15 | 41.6 | 16.8 | 789 |
| 7 | 9.8 | 9.22 | 0.29 | 41.3 | 23 | 765 |
| 8 | 98 | 8.2 | 2.8 | 36.7 | 20 | 760 |
| 1. b (Control) | 0 | 9.3 | 0 | 42 | 15.6 | 710 |

What is claimed is:

1. A synthetic resin composition having improved impact strength which comprises
   (a) a thermoplastic polymer
   (b) from 0.5 to 50 parts by weight per 100 parts by weight of thermoplastic polymer of a graft copolymer impact additive which comprises:
   (i) a backbone consisting essentially of a statistical copolymer of butadiene or isoprene with an alkyl acrylate of $C_2$ to $C_{12}$ alkyl, and a polyfunctional crosslinking agent copolymerizable with the diene and alkyl acrylate, said polyfunctional cross-linking agent having at least two allyl or vinyl unsaturated [$CH_2=C$] groups and being present in a molar proportion of from about 0.02% to about 10%, and wherein the butadiene or isoprene represents from 0.5 to about 35% of the weight of the backbone, and
   (ii) a polymer grafted onto said backbone, said grafted polymer consisting essentially of a polymer of a C1–C4 alkyl methacrylate said grafted polymer representing from 10 to 200% of the weight of the backbone.

2. A resin composition according to claim 1, in which the cross-linking agent is selected from the group consisting of one or more of allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalate, diallyl itaconate, and divinylbenzene.

3. A composition according to claim 1, in which the crosslinking agent is a polyoxyalkylene glycol diacrylate or dimethylacrylate with the formula

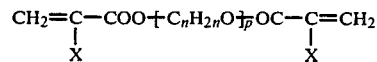

in which X is hydrogen or methyl, n is a whole number ranging from 2 to 4, and p is whole number ranging from 2 to 20.

4. A composition according to claim 1 in which the crosslinking agent is present in a molar proportion of from about 0.2% to about 10%.

5. A composition according to claim 1 in which the polymerized butadiene or isoprene in the backbone is from about 1 to about 25% by weight of the backbone.

6. A composition according to claim 1 in which the alkyl methacrylate of the grafted polymer is methyl methacrylate.

7. A composition according to claim 1 in which the thermoplastic polymer comprises a homopolymer or copolymer of vinyl chloride.

8. A composition according to claim 1 in which the grafted polymer is from 10% to 60% of the weight of the backbone.

9. A thermoplastic resin composition according to claim 1, having improved low temperature impact strength which comprises
   (a) a homopolymer or copolymer of vinyl chloride and
   (b) from 1 to 30 parts by weight per 100 parts by weight of vinyl chloride polymer of a graft copolymer impact additive which comprises
   (i) a backbone which consisting essentially of a statistical polymer containing 1 to 25% by weight of butadiene or isoprene, up to 10 mole % of polyfunctional cross-linking agent containing at least two $CH_2=C<$ groups in its molecule, and an alkyl acrylate where the alkyl group is $C_1$-$C_4$ alkyl and
   (ii) a polymer grafted onto said backbone, said grafted polymer consisting essentially of a polymer of methyl methacrylate, the grafted polymer being from about 10% to about 60% of the weight of the backbone.

10. A composition according to claim 9 which is from about 2 to about 10 parts by weight of graft copolymer impact additive per 100 parts by weight of vinyl chloride polymer.

11. A composition according to claim 9 in which the backbone is from 0.05 to 7 mole % of polyfunctional crosslinking agent.

12. A composition according to claim 11 in which the polyfunctional cross-linking agent comprises allyl acrylate or methacrylate, alkylene glycol diacrylate or dimethacrylate with 2 to 10 atoms of carbon in the alkylene chain, trimethylol propane triacrylate or trimethacrylate, triallyl cyanurate, triallyl isocyanurate, diallyl phthalates, diallyl itaconate or divinylbenzene.

13. A composition according to claim 9 in which the crosslinking agent is a polyoxyalkylene glycol diacrylate or dimethylacrylate with the formula

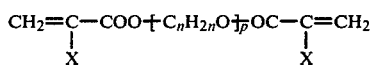

in which X is hydrogen or methyl, n is a whole number ranging from 2 to 4, and p is a whole number ranging from 2 to 20.

14. A method for improving the impact resistance of a thermoplastic resin which comprises incorporating therein from 0.5 to 50% by weight of a graft copolymer impact additive which comprises
   (i) a backbone which consisting essentially of a statistical copolymer containing 0.5 to 35% by weight of butadiene or isoprene, an alkyl acrylate where the alkyl group is $C_2$-$C_{12}$ alkyl, and from 0.02 up to 10 mole % of a polyfunctional cross-linking agent copolymerizable with the diene and alkyl acrylate and which contains at least two $CH_2=C<$ groups, and
   (ii) a polymer grafted onto said backbone, said grafted polymer being 10% to 200% of the weight of the backbone and consisting essentially of a polymer of a $C_1$-$C_4$ alkyl methacrylate.

15. A method according to claim 14 in which the backbone contains 0.02 to 10 mole % of a cross-linking agent which is allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalate, diallyl itaconate or divinylbenzene.

16. A method according to claim 14 in which the backbone is 0.02 to 10 mole % of a cross-linking agent selected from polyoxyalkylene glycol diacrylate or dimethylacrylate with the formula

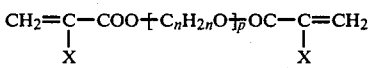

in which X is hydrogen or methyl, n is a whole number ranging from 2 to 4, and p is whole number ranging from 2 to 20.

17. A method according to claim 14 in which the backbone is from 1 to 25% by weight of butadiene or isoprene.

18. A method according to claim 17 in which the backbone is a copolymer of butadiene or isoprene with a $C_1$-$C_4$ alkyl acrylate.

19. A composition according to claim 14 in which the grafted polymer is a polymer of methyl methacrylate.

20. A method according to claim 14 in which the thermoplastic resin comprises a homopolymer or copolymer of vinyl chloride.

21. A method according to claim 20 in which the graft copolymer impact modifier is incorporated in an amount of from 1 to 30% by weight of the resin.

22. A method according to claim 14 which comprises incorporating from about 2 to about 10% by weight of the graft copolymer impact modifier into a vinyl chloride homopolymer or copolymer.

23. A method according to claim 14 in which the graft copolymer impact additive has a molten viscosity of between 6 and 40 Nm for the torque of a Brabender rheometer determined using 50 gms of impact additive maintained in said rheometer for 20 minutes at 200° C. with a rotor rotation rate of 40 rpm.

24. A graft copolymer which consisting essentially of
   (i) a backbone which consisting essentially of a statistical copolymer containing 0.5 to 35% by weight of butadiene or isoprene, an alkyl acrylate where the alkyl group is $C_2$-$C_{12}$ alkyl, and from 0.02 up to 10 mole % of a polyfunctional cross-linking agent copolymerizable with the diene and alkyl acrylate and which contains at least two $CH_2=C<$ groups, and
   (ii) a copolymer grafted onto said backbone, said grafted copolymer being 10% to 200% of the weight of the backbone and consisting essentially of a statistical copolymer of a $C_1$-$C_4$ alkyl methacrylate with 5 to 50 mole % of a $C_1$-$C_8$ alkyl acrylate.

25. A graft copolymer according to claim 24 in which the backbone is 0.02 to 10 mole % of a cross-linking agent which is a allyl acrylate or methacrylate, alkylene glycol diacrylate or dimethacrylate with 2 to 10 atoms of carbon in the alkylene chain, trimethylolpropane triacrylate or trimethacrylate, triallyl cyanurate, triallyl isocyanurate, diallyl phthalate, diallyl itaconate or divinylbenzene.

26. A graft copolymer according to claim 24 in which the backbone is 0.02 to 10 mole % of a cross-linking agent which is a polyoxyalkylene glycol diacrylate or dimethylacrylate with the formula

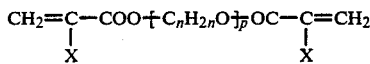

in which X is hydrogen or methyl, n is a whole number ranging from 2 to 4, and p is whole number ranging from 2 to 20.

27. A graft copolylmer according to claim 24 in which the backbone is from 1 to 25% by weight of butadiene or isoprene.

28. A graft copolymer according to claim 27 in which the backbone is a copolymer of butadiene or isoprene with a $C_1$-$C_4$ alkyl acrylate.

29. A graft copolymer according to claim 24 in which the grafted polymer is a polymer of methyl methacrylate.

30. A graft copolymer according to claim 24 which has a molten viscosity of between 6 and 40 Nm for the torque of a Brabender rheometer determined using 50 gms of impact additive maintained in said rheometer for 20 minutes at 200° C. with a rotor rotation rate of 40 rpm.

* * * * *